US010814595B2

(12) United States Patent
Alef et al.

(10) Patent No.: US 10,814,595 B2
(45) Date of Patent: Oct. 27, 2020

(54) CONTAINER PRECURSOR WITH SHAPING COEFFICIENT, ESPECIALLY FOR A SINGLE DIMENSIONALLY STABLE FOOD OR DRINK PRODUCT CONTAINER

(71) Applicant: SIG TECHNOLOGY AG, Neuhausen am Rheinfall (CH)

(72) Inventors: Ulrich Alef, Wegberg (DE); Horst Pawelczyk, Aldenhoven (DE); Stefan Schnorr, Düren (DE)

(73) Assignee: SIG TECHNOLOGY AG, Neuhausen am Rheinfall (CH)

( * ) Notice: Subject to any disclaimer, the term of this patent is extended or adjusted under 35 U.S.C. 154(b) by 94 days.

(21) Appl. No.: 16/304,529

(22) PCT Filed: May 24, 2017

(86) PCT No.: PCT/EP2017/062543
§ 371 (c)(1),
(2) Date: Nov. 26, 2018

(87) PCT Pub. No.: WO2017/202912
PCT Pub. Date: Nov. 30, 2017

(65) Prior Publication Data
US 2019/0299565 A1     Oct. 3, 2019

(30) Foreign Application Priority Data

May 27, 2016  (DE) .................. 10 2016 209 237
Dec. 26, 2016 (CN) .................. 2016 1 1218497
Dec. 26, 2016 (CN) .................. 2016 2 1437302 U

(51) Int. Cl.
*B32B 27/10*     (2006.01)
*B31B 50/26*     (2017.01)
(Continued)

(52) U.S. Cl.
CPC .............. *B32B 27/10* (2013.01); *B31B 50/25* (2017.08); *B31B 50/26* (2017.08); *B32B 7/12* (2013.01);
(Continued)

(58) Field of Classification Search
CPC ......... B32B 27/10; B32B 7/12; B32B 15/085; B32B 15/14; B32B 27/08; B32B 27/306;
(Continued)

(56) References Cited

U.S. PATENT DOCUMENTS 3,274,047 A   9/1966  Sloan
3,735,674 A   5/1973  Haddock
(Continued)

FOREIGN PATENT DOCUMENTS

| DE | 1083638 A  | 6/1960 |
|---|---|---|
| WO | 9009926 A2 | 9/1990 |
| WO | 9100827 A1 | 1/1991 |

OTHER PUBLICATIONS

International Search Report and Written Opinion issued in International Application No. PCT/EP2017/062543 dated Sep. 12, 2017.

*Primary Examiner* — Michael C Miggins
(74) *Attorney, Agent, or Firm* — Meunier Carlin & Curfman LLC

(57) ABSTRACT

The invention relates to a container precursor comprising a sheetlike composite, wherein the sheetlike composite a) comprises a layer sequence comprising, as mutually superposed layers, from an inner face of the sheetlike composite to an outer face of the sheetlike composite, i) an inner polymer layer, ii) a barrier layer, and iii) a carrier layer; b) comprises a first longitudinal edge and a further longitudinal edge, wherein the first longitudinal edge is bonded to the further longitudinal edge forming a longitudinal seam of the container precursor; c) comprises, in the following sequence in the direction from the first longitudinal edge to the further longitudinal edge i) a first longitudinal groove, ii) a second longitudinal groove, iii) a third longitudinal groove, and iv) a fourth longitudinal groove, wherein the container precursor can be shaped to form a jacket structure by folding along the first longitudinal groove, the second longitudinal groove,
(Continued)

Figure 1:
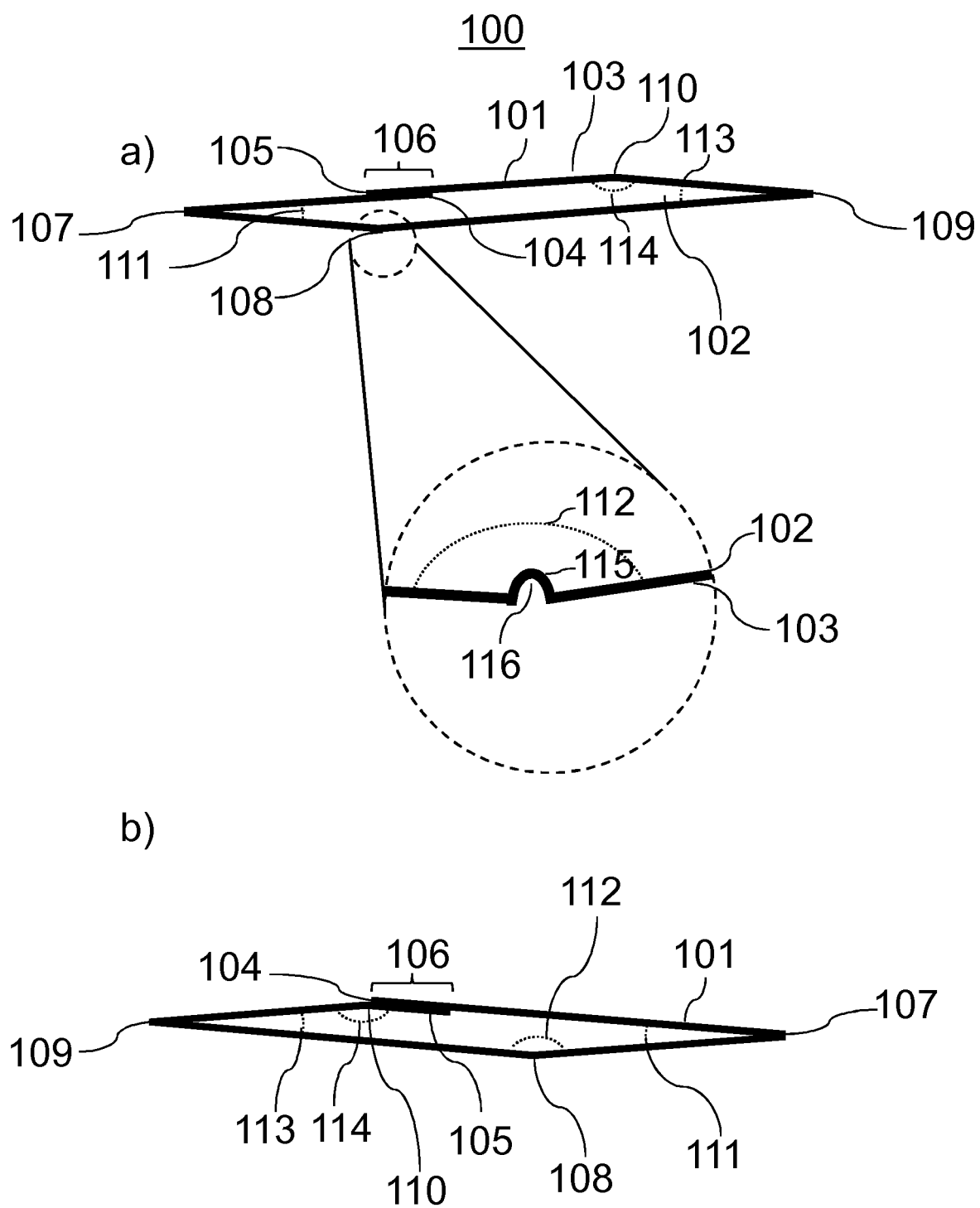

the third longitudinal groove and the fourth longitudinal groove; wherein the container precursor is characterized by a shaping coefficient as per the test method described herein within a range from 8 to 30 m2/g. The invention further relates to a closed container, to a method, to an apparatus and to the use of the container precursor.

9 Claims, 11 Drawing Sheets

(51) Int. Cl.

| | |
|---|---|
| B32B 7/12 | (2006.01) |
| B32B 15/085 | (2006.01) |
| B32B 15/14 | (2006.01) |
| B32B 27/08 | (2006.01) |
| B32B 27/30 | (2006.01) |
| B32B 27/32 | (2006.01) |
| B32B 27/34 | (2006.01) |
| B65D 5/06 | (2006.01) |
| B65D 85/72 | (2006.01) |
| B32B 15/20 | (2006.01) |
| B32B 29/00 | (2006.01) |
| B65B 3/02 | (2006.01) |
| B65D 65/40 | (2006.01) |
| B65D 75/08 | (2006.01) |
| B65D 65/42 | (2006.01) |
| B32B 15/12 | (2006.01) |
| B65D 5/36 | (2006.01) |
| B31B 50/25 | (2017.01) |
| B31B 120/30 | (2017.01) |
| B31B 100/00 | (2017.01) |
| B65D 5/74 | (2006.01) |
| B65B 43/26 | (2006.01) |

(52) U.S. Cl.
CPC ............ *B32B 15/085* (2013.01); *B32B 15/12* (2013.01); *B32B 15/14* (2013.01); *B32B 15/20* (2013.01); *B32B 27/08* (2013.01); *B32B 27/306* (2013.01); *B32B 27/32* (2013.01); *B32B 27/327* (2013.01); *B32B 27/34* (2013.01); *B32B 29/00* (2013.01); *B65B 3/025* (2013.01); *B65D 5/064* (2013.01); *B65D 5/065* (2013.01); *B65D 5/36* (2013.01); *B65D 65/40* (2013.01); *B65D 65/42* (2013.01); *B65D 75/08* (2013.01); *B65D 85/72* (2013.01); *B31B 2100/0022* (2017.08); *B31B 2120/30* (2017.08); *B32B 2255/10* (2013.01); *B32B 2255/205* (2013.01); *B32B 2270/00* (2013.01); *B32B 2307/30* (2013.01); *B32B 2307/402* (2013.01); *B32B 2307/4023* (2013.01); *B32B 2307/514* (2013.01); *B32B 2307/536* (2013.01); *B32B 2307/546* (2013.01); *B32B 2307/7244* (2013.01); *B32B 2307/734* (2013.01); *B32B 2307/75* (2013.01); *B32B 2435/00* (2013.01); *B32B 2439/40* (2013.01); *B32B 2439/62* (2013.01); *B32B 2439/70* (2013.01); *B65B 43/265* (2013.01); *B65D 5/746* (2013.01)

(58) Field of Classification Search
CPC ....... B32B 27/327; B32B 27/34; B32B 15/20; B32B 27/32; B32B 29/00; B32B 2307/4023; B32B 2307/514; B32B 2307/7244; B32B 2439/62; B32B 2439/70; B32B 2255/10; B32B 2255/205; B32B 15/12; B31B 50/26; B31B 50/25; B31B 2120/30; B31B 2100/0022; B65B 3/025; B65D 5/065; B65D 85/72; B65D 65/40; B65D 75/08; B65D 65/42; B65D 65/066; B65D 5/064
See application file for complete search history.

(56) References Cited

U.S. PATENT DOCUMENTS

| | | |
|---|---|---|
| 3,942,708 A | 3/1976 | Christensson |
| 4,790,123 A | 12/1988 | Ljungstroem et al. |
| 6,454,367 B1 | 9/2002 | Rhoades |
| 9,221,228 B2 | 12/2015 | Wolters et al. |
| 10,011,379 B2 | 7/2018 | Baltes et al. |
| 2014/0242311 A1 | 8/2014 | Wolters et al. |
| 2014/0260119 A1 | 9/2014 | Baltes et al. |

100

101, 400

500

600

700

800 a)

A-A b)

B-B a)

b)

800 a)

b)

101, 107 - 110

CONTAINER PRECURSOR WITH SHAPING COEFFICIENT, ESPECIALLY FOR A SINGLE DIMENSIONALLY STABLE FOOD OR DRINK PRODUCT CONTAINER

The present invention relates to a container precursor comprising a rigid sheetlike composite for a food or drink product container, wherein the sheetlike composite
  a) comprises a layer sequence comprising, as mutually superposed layers, from an inner face of the sheetlike composite to an outer face of the sheetlike composite,
    i) an inner polymer layer,
    ii) a barrier layer, and
    iii) a carrier layer;
  b) comprises a first longitudinal edge and a further longitudinal edge, wherein the first longitudinal edge is bonded to the further longitudinal edge forming a longitudinal seam of the container precursor;
  c) comprises, in the following sequence in the direction from the first longitudinal edge to the further longitudinal edge
    i) a first longitudinal groove,
    ii) a second longitudinal groove,
    iii) a third longitudinal groove, and
    iv) a fourth longitudinal groove,
wherein a first longitudinal fold along the first longitudinal groove is characterized by a first internal angle of at least 165°; wherein a second longitudinal fold along the second longitudinal groove is characterized by a second internal angle of not more than 15°; wherein a third longitudinal fold along the third longitudinal groove is characterized by a third internal angle of at least 165°; wherein a fourth longitudinal fold along the fourth longitudinal groove is characterized by a fourth internal angle of not more than 15°; wherein the container precursor can be shaped to form a jacket structure by folding along the first longitudinal groove, the second longitudinal groove, the third longitudinal groove and the fourth longitudinal groove; wherein the container precursor is characterized by a shaping coefficient as per the test method described herein within a range from 8 to 30 m$^2$/g. The invention further relates to a closed container, especially for food or drink products, obtainable from the container precursor; to a method of producing a closed container from the container precursor; to an apparatus for producing a closed container filled with a food or drink product from the container precursor; and to the use of the container precursor.

For some time, food and drink products, whether they be food and drink products for human consumption or else animal feed products, have been conserved by storing them either in a can or in a jar closed by a lid. In this case, shelf life can be increased firstly by separately and very substantially sterilizing the food or drink product and the container in each case, here the jar or can, and then introducing the food or drink product into the container and closing the container. However, these measures of increasing the shelf life of food and drink products, which have been tried and tested over a long period, have a series of disadvantages, for example the need for another sterilization later on. Cans and jars, because of their essentially cylindrical shape, have the disadvantage that very dense and space-saving storage is not possible. Moreover, cans and jars have considerable intrinsic weight, which leads to increased energy expenditure in transport. In addition, production of glass, tinplate or aluminium, even when the raw materials used for the purpose are recycled, necessitates quite a high expenditure of energy. In the case of jars, an additional aggravating factor is elevated expenditure on transport. The jars are usually prefabricated in a glass factory and then have to be transported to the facility where the food and drink products are dispensed with utilization of considerable transport volumes. Furthermore, jars and cans can be opened only with considerable expenditure of force or with the aid of tools and hence in a rather laborious manner. In the case of cans, there is a high risk of injury emanating from sharp edges that arise on opening. In the case of jars, it is a regular occurrence that broken glass gets into the food or drink product in the course of filling or opening of the filled jars, which can lead in the worst case to internal injuries on consumption of the food or drink product. In addition, both cans and jars have to be labelled for identification and promotion of the food or drink product contents. The jars and cans cannot be printed directly with information and promotional messages. In addition to the actual printing, a substrate is thus needed for the purpose, a paper or suitable film, as is a securing means, an adhesive or sealant.

Other packaging systems are known from the prior art, in order to store food and drink products over a long period with minimum impairment. These are containers produced from sheetlike composites—frequently also referred to as laminates. Sheetlike composites of this kind are frequently constructed from a thermoplastic plastic layer, a carrier layer usually consisting of cardboard or paper which imparts dimensional stability to the container, an adhesion promoter layer, a barrier layer and a further plastic layer, as disclosed inter alia in WO 90/09926 A2. Since the carrier layer imparts dimensional stability to the container manufactured from the laminate, these containers, by contrast to film bags, have to be regarded as a further development of the aforementioned jars and cans.

In this context, these laminate containers already have many advantages over the conventional jars and cans. Nevertheless, there are also opportunities for improvement in the case of these packaging systems. For instance, container precursors are typically first produced from the laminate by a manufacturing method which includes folding and sealing. These container precursors have to be transported and stored in a space-saving manner, and for this reason they are converted to an interfolded, flat state in course of their production. These flat-folded container precursors are used, in a further method, to produce containers, which are typically filled and closed in the course of this later method. The processing of the container precursor in the aforementioned further methods proceeds in a very substantially automated manner. In this context, a particular aim is faultless running without delays. Faults in the running of the method lead to production of rejects, to production downtime and hence to rising costs, and to increased manual labour and hence also personnel demands in the production.

It has been found that non-ideal shaping characteristics of the flat-folded container precursors in particular can result in the aforementioned faults in the running of production.

In general terms, it is an object of the present invention to at least partly overcome a drawback which arises from the prior art. It is a further object of the invention to provide a container precursor for laminate food and drink product containers which can be transported and stored in a space-saving manner and which is notable for improved processability, preferably for improved shaping characteristics. It is a further object of the invention to provide a container precursor for laminate food and drink product containers which leads to fewer faults in container production, preferably in a filling machine. It is a further object of the invention to provide a container precursor which can reduce downtime of a filling machine. It is a further object of the invention to provide a container precursor for laminate food and drink product containers which can be shaped more reliably and with fewer faults and placed onto a mandrel wheel. It is a further object of the invention to provide a container precursor for laminate food and drink product containers which increases productivity of a container production method. It is also an object of the invention to provide a container precursor having an outer polymer layer and/or decorative layer that suffers less damage. It is a further object of the invention to provide a container precursor having a combination of the aforementioned advantages. It is a further object of the invention to reduce production faults and stoppages in container production. It is a further object of the invention to provide the container precursor with a minimum number of mechanical parts for filling with a food or drink product.

A contribution to at least partial achievement of at least one of the above objects is made by the independent claims. The dependent claims provide preferred embodiments which contribute to at least partial achievement of at least one of the objects.

A contribution to the achievement of at least one of the objects of the invention is made by an embodiment 1 of a container precursor comprising a sheetlike composite, wherein the sheetlike composite
   a) comprises a layer sequence comprising, as mutually superposed layers, from an inner face of the sheetlike composite to an outer face of the sheetlike composite,
      i) an inner polymer layer,
      ii) a barrier layer, and
      iii) a carrier layer;
   b) comprises a first longitudinal edge and a further longitudinal edge, wherein the first longitudinal edge is bonded to the further longitudinal edge forming a longitudinal seam of the container precursor;
   c) comprises, in the following sequence in the direction from the first longitudinal edge to the further longitudinal edge
      i) a first longitudinal groove,
      ii) a second longitudinal groove,
      iii) a third longitudinal groove, and
      iv) a fourth longitudinal groove,
wherein a first longitudinal fold along the first longitudinal groove is characterized by a first internal angle of at least 165°, preferably of at least 170°, more preferably of at least 175°, most preferably of at least 178°; wherein a second longitudinal fold along the second longitudinal groove is characterized by a second internal angle of not more than 15°, preferably of not more than 10°, more preferably of not more than 5°, most preferably of not more than 3°; wherein a third longitudinal fold along the third longitudinal groove is characterized by a third internal angle of at least 165°, preferably of at least 170°, more preferably of at least 175°, most preferably of at least 178°; wherein a fourth longitudinal fold along the fourth longitudinal groove is characterized by a fourth internal angle of not more than 15°, preferably of not more than 10°, more preferably of not more than 5°, most preferably of not more than 3°; wherein the container precursor can be shaped to form a jacket structure by folding along the first longitudinal groove, the second longitudinal groove, the third longitudinal groove and the fourth longitudinal groove; wherein the container precursor is characterized by a shaping coefficient as per the test method described herein within a range from 8 to 30 m²/kg, preferably from 8.5 to 28 m²/kg, more preferably from 9 to 27 m²/kg, more preferably from 9.5 to 26.5 m²/kg, most preferably from 10 to 26.5 m²/kg.

The container precursor is preferably folded flat, the container precursor preferably having a thickness of less than 10 mm, more preferably less than 8 mm, more preferably less than 5 mm, most preferably less than 4 mm. Further preferably, the container precursor is in one-piece form.

In one embodiment 2 of the invention, the container precursor is configured according to embodiment 1, wherein the carrier layer of the sheetlike composite comprises an oriented material, wherein the oriented material is characterized by a direction of orientation, wherein the direction of orientation forms an angle of orientation with one selected from the group consisting of the first longitudinal groove, the second longitudinal groove, the third longitudinal groove and the fourth longitudinal groove, or with a combination of at least two thereof, wherein the angle of orientation is within a range from 60 to 120°, preferably from 70 to 110°, more preferably from 75 to 105°, more preferably from 80 to 100°, most preferably from 85 to 95°. A preferred oriented material is one selected from the group consisting of cardboard, paperboard and paper or a combination of at least two thereof. A preferred direction of orientation is a direction of a majority of fibres of the oriented material. The carrier layer preferably consists of the oriented material.

In one embodiment 3 of the invention, the container precursor is configured according to embodiment 1 or 2, wherein the longitudinal grooves each comprise a recess on the outer face of the sheetlike composite and a bulge on the inner face of the sheetlike composite. The longitudinal grooves have preferably been produced by the action of a creasing tool on the outer face of the sheetlike composite.

In one embodiment 4 of the invention, the container precursor is configured according to any of the preceding embodiments, wherein the carrier layer is split at least partly into at least 2 separate sublayers along at least 2, preferably at least 3, more preferably 4, selected from the group consisting of the first longitudinal groove, the second longitudinal groove, the third longitudinal groove and the fourth longitudinal groove.

In one embodiment 5 of the invention, the container precursor is configured according to any of the preceding embodiments, wherein the carrier layer forms a cavity along each of at least 2, preferably at least 3, more preferably 4, selected from the group consisting of the first longitudinal groove, the second longitudinal groove, the third longitudinal groove and the fourth longitudinal groove.

In one embodiment 6 of the invention, the container precursor is configured according to any of the preceding embodiments, wherein the sheetlike composite is a blank for production of a single container.

In one embodiment 7 of the invention, the container precursor is configured according to any of the preceding embodiments, wherein the carrier layer is superimposed by an outer polymer layer on a side of the carrier layer facing away from the barrier layer. Further preferably, the outer polymer layer is superimposed by a colour layer, preferably a decoration, on a side of the outer polymer layer facing away from the carrier layer. The colour layer preferably comprises at least one colourant.

In one embodiment 8 of the invention, the container precursor is configured according to any of the preceding embodiments, wherein the barrier layer comprises, preferably consists of, one selected from the group consisting of a plastic, a metal and a metal oxide, or a combination of at least two thereof.

In one embodiment 9 of the invention, the container precursor is configured according to any of the preceding embodiments, wherein the inner polymer layer comprises a polymer prepared by means of a metallocene catalyst to an extent of 10% to 90% by weight, preferably to an extent of 25% to 90% by weight, more preferably to an extent of 30% to 80% by weight, based in each case on the total weight of the inner polymer layer.

In one embodiment 10 of the invention, the container precursor is configured according to any of embodiments 1 to 8, wherein the inner polymer layer comprises a polymer blend, wherein the polymer blend comprises an mPE to an extent of 10% to 90% by weight, preferably to an extent of 25% to 90% by weight, more preferably to an extent of 30% to 80% by weight, and a further polymer to an extent of at least 10% by weight, preferably to an extent of at least 15% by weight, more preferably to an extent of at least 20% by weight, based in each case on the total weight of the polymer blend.

In one embodiment 11 of the invention, the container precursor is configured according to any of the preceding embodiments, wherein the carrier layer comprises, preferably consists of, one selected from the group consisting of cardboard, paperboard and paper, or a combination of at least two thereof.

In one embodiment 12 of the invention, the container precursor is configured according to any of the preceding embodiments, wherein the carrier layer has at least one hole, wherein the hole is covered at least by the barrier layer and at least by the inner polymer layer as hole-covering layers.

A contribution to the achievement of at least one of the objects of the invention is made by an embodiment 1 of a closed container 1 obtainable by closing the container precursor according to any of embodiments 1 to 12. The closing is preferably effected by folding the sheetlike composite and bonding of regions of the sheetlike composite. A preferred bonding is a sealing. Preferably, the container is filled with a food or drink product prior to the closure. Thus, the closed container has preferably been filled with a food or drink product. The closed container preferably does not comprise any lid or base, or both, that has not been formed in one piece with the sheetlike composite.

A contribution to the achievement of at least one of the objects of the invention is made by an embodiment 1 of a method comprising, as method steps,
a) providing the container precursor according to any of embodiments 1 to 12,
b) forming a base region of the container precursor by folding the sheetlike composite,
c) closing the base region,
d) filling the container precursor with a food or drink product, and
e) closing the container precursor in a top region thereby obtaining a closed container.

Preferably, the method includes, between the method steps a) and b), a shaping of the container precursor and preferably further comprises a placing of the shaped container precursor onto a mandrel, preferably of a mandrel wheel.

In one embodiment 2 of the invention, the method is configured according to embodiment 1, wherein at least a portion of the sheetlike composite during the folding in method step b) has a temperature within a range from 10 to 50° C., preferably from 15 to 40° C., more preferably from 16 to 30° C., most preferably from 18 to 25° C. A preferred portion of the sheetlike composite here is a portion in which a fold is produced.

In one embodiment 3 of the invention, the method is configured according to embodiment 1 or 2, wherein the closing in method step c) or e) or in both comprises a sealing, wherein the sealing is effected by means of one selected from the group consisting of irradiation, contacting with a hot solid, inducement of a mechanical vibration and contacting with a hot gas, or by a combination of at least two of these.

In one embodiment 4 of the invention, the method is configured according to any of embodiments 1 to 3, wherein the method further comprises a method step f), wherein the closed container is bonded to an opening aid in method step f). Preferably, the closed container is bonded to the opening aid in such a way that the opening aid covers a hole in the carrier layer. A preferred opening aid is a cutting tool, for example a cutting ring. Further preferably, the opening aid may include a lid.

A contribution to the achievement of at least one of the objects of the invention is made by an embodiment 1 of a closed container obtainable by the method according to any of embodiments 1 to 4. Preferably, the closed container does not include any lid or base, or both, that has not been formed in one piece with the sheetlike composite.

A contribution to the achievement of at least one of the objects of the invention is made by an embodiment 1 of an apparatus designed for
a) producing a container from the container precursor according to any of embodiments 1 to 12,
b) filling the container with a food or drink product thereby obtaining a filled container, and
c) closing the filled container thereby obtaining a closed container.

A preferred apparatus is a filling machine. A further preferred apparatus comprises a mandrel, preferably designed to accommodate the container precursor, wherein the mandrel is preferably part of a mandrel wheel designed to transport the container precursor.

A contribution to the achievement of at least one of the objects of the invention is made by an embodiment 1 of a use of the container precursor according to any of embodiments 1 to 12 for production of a closed container filled with a food or drink product.

Features described as preferred in one category of the invention are likewise preferred in an embodiment of the further categories of the invention.

Layers

Two layers have been bonded to one another when their adhesion to one another extends beyond van der Waals attraction forces. Layers bonded to one another are preferably layers selected from the group consisting of mutually sealed, mutually glued and mutually compressed layers, or a combination of at least two thereof. Unless stated otherwise, in a layer sequence, the layers may follow one another indirectly, i.e. with one or at least two interlayers, or directly, i.e. without an interlayer. This is especially the case in the form of words in which one layer superimposes another layer. A form of words in which a layer sequence comprises enumerated layers means that at least the layers specified are present in the sequence specified. This form of words does not necessarily mean that these layers immediately follow one another. A form of words in which two layers adjoin one another means that these two layers lie directly one on top of the other and hence without an interlayer. However, this form of words does not make any stipulation as to whether the two layers are bonded to one another or not. Instead, these two layers may be in contact with one another.

Polymer Layers

The term "polymer layer" hereinafter relates especially to the inner polymer layer and the outer polymer layer, more preferably to the inner polymer layer. A preferred polymer, especially for the inner polymer layer, is a polyolefin. The polymer layers may include further constituents. The polymer layers are preferably introduced into or applied to the sheetlike composite material in an extrusion process. The further constituents of the polymer layers are preferably constituents that do not adversely affect the behaviour of the polymer melt on application as a layer. The further constituents may, for example, be inorganic compounds such as metal salts or further polymers such as further thermoplastics. However, it is also conceivable that the further constituents are fillers or pigments, for example carbon black or metal oxides. Suitable thermoplastics for the further constituents especially include those that are easily processable by virtue of good extrusion characteristics. Among these, polymers obtained by chain polymerization are suitable, especially polyesters or polyolefins, particular preference being given to cyclic olefin copolymers (COCs), polycyclic olefin copolymers (POCs), especially polyethylene and polypropylene, and very particular preference to polyethylene. Among the polyethylenes, HDPE (high density polyethylene), MDPE (medium density polyethylene), LDPE (low density polyethylene), LLDPE (linear low density polyethylene), VLDPE (very low density polyethylene) and PE (polyethylene) and mixtures of at least two thereof are preferred. It is also possible to use mixtures of at least two thermoplastics. Suitable polymer layers have a melt flow rate (MFR) within a range from 1 to 25 g/10 min, preferably within a range from 2 to 20 g/10 min and especially preferably within a range from 2.5 to 15 g/10 min, and a density within a range from 0.890 $g/cm^3$ to 0.980 $g/cm^3$, preferably within a range from 0.895 $g/cm^3$ to 0.975 $g/cm^3$, and further preferably within a range from 0.900 $g/cm^3$ to 0.970 $g/cm^3$. The polymer layers preferably have at least one melting temperature within a range from 80 to 155° C., preferably within a range from 90 to 145° C. and especially preferably within a range from 95 to 135° C. Preferably, the sheetlike composite comprises, between the barrier layer and the carrier layer, a polymer layer, preferably a polyolefin layer, preferably a polyethylene layer. Further preferably, the composite precursor comprises, between the barrier layer and the carrier layer, a polymer layer, preferably a polyolefin layer, preferably a polyethylene layer. The above remarks relating to the polymer layers also apply to these polymer layers, also called adhesion promoter layers herein, of the composite and the composite precursor.

Inner Polymer Layer

The inner polymer layer is based on thermoplastic polymers, and the inner polymer layer may include a particulate inorganic solid. It is preferable, however, that the inner polymer layer comprises a thermoplastic polymer to an extent of at least 70% by weight, preferably at least 80% by weight and especially preferably at least 95% by weight, based in each case on the total weight of the inner polymer layer. It is further preferable that the inner polymer layer comprises at least 30% by weight, especially preferably at least 40% by weight and most preferably at least 50% by weight, based in each case on the total weight of the inner polymer layer, of a polyolefin prepared by means of a metallocene catalyst, preferably a polyethylene prepared by means of a metallocene catalyst (mPE). Further preferably, the inner polymer layer comprises an mLLDPE (linear low density polyethylene prepared by means of a metallocene catalyst).

Preferably, the polymer or polymer mixture of the inner polymer layer has a density (according to ISO 1183-1:2004) within a range from 0.900 to 0.930 $g/cm^3$, especially preferably within a range from 0.900 to 0.920 $g/cm^3$ and most preferably within a range from 0.900 to 0.910 $g/cm^3$. The MFR (ISO 1133, 190° C./2.16 kg) is preferably within a range from 4 to 17 g/10 min, especially preferably within a range from 4.5 to 14 g/10 min and most preferably within a range from 6.5 to 10 g/10 min.

Carrier Layer

The carrier layer used may be any material which is suitable for a person skilled in the art for this purpose and which has sufficient strength and stiffness to impart stability to the container to such an extent that the container in the filled state essentially retains its shape. This is, in particular, a necessary feature of the carrier layer since the invention relates to the technical field of dimensionally stable containers. As well as a number of plastics, preference is given to plant-based fibrous materials, especially pulps, preferably limed, bleached and/or unbleached pulps, paper and cardboard being especially preferred. The grammage of the carrier layer is preferably within a range from 120 to 450 $g/m^2$, especially preferably within a range from 130 to 400 $g/m^2$ and most preferably within a range from 150 to 380 $g/m^2$. A more preferred cardboard generally has a single-layer or multilayer structure and may have been coated on one or both sides with one or else more than one covering layer. In addition, a more preferred cardboard has a residual moisture content of less than 20% by weight, preferably of 2% to 15% by weight and especially preferably of 4% to 10% by weight, based on the total weight of the cardboard. A more particularly preferred cardboard has a multilayer structure. Further preferably, the cardboard has, on the surface facing the environment, at least one lamina, but more preferably at least two laminas, of a covering layer known to the person skilled in the art as a "paper coating". In addition, a more preferred cardboard has a Scott bond value within a range from 100 to 360 $J/m^2$, preferably from 120 to 350 $J/m^2$ and especially preferably from 135 to 310 $J/m^2$. By virtue of the aforementioned ranges, it is possible to provide a composite from which it is possible to fold a container with high integrity, easily and in low tolerances.

Barrier Layer

The barrier layer used may be any material which is suitable for a person skilled in the art for this purpose and which has sufficient barrier action, especially with respect to oxygen. The barrier layer is preferably selected from
    a. a polymer barrier layer;
    b. a metal layer;
    c. a metal oxide layer; or
    d. a combination of at least two from a. to c.

If the barrier layer, according to alternative a., is a polymer barrier layer, this preferably comprises at least 70% by weight, especially preferably at least 80% by weight and most preferably at least 95% by weight of at least one polymer which is known to the person skilled in the art for this purpose, especially for aroma or gas barrier properties suitable for packaging containers. Useful polymers, especially thermoplastics, here include N- or O-bearing polymers, either alone or in mixtures of two or more. According to the invention, it may be found to be advantageous when the polymer barrier layer has a melting temperature within a range from more than 155 to 300° C., preferably within a range from 160 to 280° C. and especially preferably within a range from 170 to 270° C.

Further preferably, the polymer barrier layer has a grammage within a range from 2 to 120 $g/m^2$, preferably within a range from 3 to 60 g/m², especially preferably within a range from 4 to 40 g/m² and further preferably from 6 to 30 g/m². Further preferably, the polymer barrier layer is obtainable from melts, for example by extrusion, especially laminar extrusion. Further preferably, the polymer barrier layer may also be introduced into the sheetlike composite via lamination. It is preferable in this context that a film is incorporated into the sheetlike composite. In another embodiment, it is also possible to select polymer barrier layers obtainable by deposition from a solution or dispersion of polymers.

Suitable polymers preferably include those having a weight-average molecular weight, determined by gel permeation chromatography (GPC) by means of light scattering, within a range from $3 \cdot 10^3$ to $1 \cdot 10^7$ g/mol, preferably within a range from $5 \cdot 10^3$ to $1 \cdot 10^6$ g/mol and especially preferably within a range from $6 \cdot 10^3$ to $1 \cdot 10^5$ g/mol. Suitable polymers especially include polyamide (PA) or polyethylene vinyl alcohol (EVOH) or a mixture thereof.

Among the polyamides, useful PAs are all of those that seem suitable to the person skilled in the art for the use according to the invention. Particular mention should be made here of PA 6, PA 6.6, PA 6.10, PA 6.12, PA 11 or PA 12 or a mixture of at least two thereof, particular preference being given to PA 6 and PA 6.6 and further preference to PA 6. PA 6 is commercially available, for example, under the Akulon®, Durethan® and Ultramid® trade names. Additionally suitable are amorphous polyamides, for example MXD6, Grivory® and Selar® PA. It is further preferable that the PA has a density within a range from 1.01 to 1.40 g/cm³, preferably within a range from 1.05 to 1.30 g/cm³ and especially preferably within a range from 1.08 to 1.25 g/cm³. It is further preferable that the PA has a viscosity number within a range from 130 to 185 ml/g and preferably within a range from 140 to 180 ml/g.

Useful EVOHs include all the EVOHs that seem suitable to the person skilled in the art for the use according to the invention. Examples of these are commercially available, inter alia, under the EVAL™ trade names from EVAL Europe NV, Belgium, in a multitude of different versions, for example the EVAL™ F104B or EVAL™ LR171B types. Preferred EVOHs have at least one, two, more than two or all the following properties:
  an ethylene content within a range from 20 to 60 mol %, preferably from 25 to 45 mol %;
  a density within a range from 1.0 to 1.4 g/cm³, preferably from 1.1 to 1.3 g/cm³;
  a melting point within a range from more than 155 to 235° C., preferably from 165 to 225° C.;
  an MFR value (210° C./2.16 kg when $T_{S(EVOH)}$<230° C.; 230° C./2.16 kg when 210° C.<$T_{S(EVOH)}$<230° C.) within a range from 1 to 25 g/10 min, preferably from 2 to 20 g/10 min;
  an oxygen permeation rate within a range from 0.05 to 3.2 cm³·20 µm/m²·day·atm, preferably within a range from 0.1 to 1 cm³·20 µm/m²·day·atm.

Preferably at least one polymer layer, further preferably the inner polymer layer, or preferably all polymer layers, have a melting temperature below the melting temperature of the barrier layer. This is especially true when the barrier layer is formed from polymer. In this case, the melting temperatures of the at least one polymer layer, especially the inner polymer layer, and the melting temperature of the barrier layer differ preferably by at least 1 K, especially preferably by at least 10 K, even more preferably by at least 50 K, further preferably at least 100 K. The temperature difference should preferably be chosen only such that it is sufficiently high that there is no melting of the barrier layer, especially no melting of the polymer barrier layer, during the folding.

According to alternative b., the barrier layer is a metal layer. Suitable metal layers are in principle all layers comprising metals which are known to the person skilled in the art and which can provide high light opacity and oxygen impermeability. In a preferred embodiment, the metal layer may take the form of a foil or a deposited layer, for example after a physical gas phase deposition. The metal layer is preferably an uninterrupted layer. In a further preferred embodiment, the metal layer has a thickness within a range from 3 to 20 µm, preferably within a range from 3.5 to 12 µm and especially preferably within a range from 4 to 10 µm.

Metals selected with preference are aluminium, iron or copper. A preferred iron layer may be a steel layer, for example in the form of a foil. Further preferably, the metal layer is a layer comprising aluminium. The aluminium layer may appropriately consist of an aluminium alloy, for example AlFeMn, AlFe1.5Mn, AlFeSi or AlFeSiMn. The purity is typically 97.5% or higher, preferably 98.5% or higher, based in each case on the overall aluminium layer. In a preferred configuration, the metal layer consists of an aluminium foil. Suitable aluminium foils have a ductility of more than 1%, preferably of more than 1.3% and especially preferably of more than 1.5%, and a tensile strength of more than 30 N/mm², preferably more than 40 N/mm² and especially preferably more than 50 N/mm². Suitable aluminium foils in the pipette test show a droplet size of more than 3 mm, preferably more than 4 mm and especially preferably of more than 5 mm. Suitable alloys for creation of aluminium layers or foils are commercially available under the EN AW 1200, EN AW 8079 or EN AW 8111 names from Hydro Aluminium Deutschland GmbH or Amcor Flexibles Singen GmbH. In the case of a metal foil as barrier layer, it is possible to provide an adhesion promoter layer between the metal foil and a closest polymer layer on one or both sides of the metal foil.

Further preferably, the barrier layer selected, according to alternative c., may be a metal oxide layer. Useful metal oxide layers include all metal oxide layers that are familiar and seem suitable to the person skilled in the art, in order to achieve a barrier effect with respect to light, vapour and/or gas. Especially preferred are metal oxide layers based on the metals already mentioned above, aluminium, iron or copper, and those metal oxide layers based on titanium oxide or silicon oxide compounds. A metal oxide layer is produced by way of example by vapour deposition of metal oxide on a polymer layer, for example an oriented polypropylene film. A preferred method for this purpose is physical gas phase deposition.

In a further preferred embodiment, the metal layer of the metal oxide layer may take the form of a layer composite composed of one or more polymer layers with a metal layer. Such a layer is obtainable, for example, by vapour deposition of metal on a polymer layer, for example an oriented polypropylene film. A preferred method for this purpose is physical gas phase deposition.

Outer Surface

The outer surface of the sheetlike composite is a surface of a lamina of the sheetlike composite which is intended to be in contact with the environment of the container in a container which is to be produced from the sheetlike composite. This does not mean that, in individual regions of the container, outer surfaces of various regions of the composite are not folded against one another or bonded to one another, for example sealed to one another.

Inner Surface

The inner surface of the sheetlike composite is a surface of a lamina of the sheetlike composite which is intended to be in contact with the contents of the container, preferably a food or drink product, in a container to be produced from the sheetlike composite.

Colourant

According to DIN 55943:2001-10, colourant is the collective term for all colouring substances, especially for dyes and pigments. A preferred colourant is a pigment. A preferred pigment is an organic pigment. Pigments that are notable in connection with the invention are especially the pigments mentioned in DIN 55943:2001-10 and those mentioned in "Industrial Organic Pigments, Third Edition" (Willy Herbst, Klaus Hunger Copyright © 2004 WILEY-VCH Verlag GmbH & Co. KGaA, Weinheim ISBN: 3-527-30576-9).

Adhesion/Adhesion Promoter Layer

An adhesion promoter layer may be present between layers which do not directly adjoin one another. More particularly, an adhesion promoter layer may be present between the barrier layer and the inner polymer layer, and between the barrier layer and the carrier layer.

Useful adhesion promoters in an adhesion promoter layer include all polymers which are suitable for producing a firm bond through functionalization by means of suitable functional groups, through the forming of ionic bonds or covalent bonds with a surface of a respective adjacent layer. Preferably, these comprise functionalized polyolefins which have been obtained by copolymerization of ethylene with acrylic acids such as acrylic acid, methacrylic acid, crotonic acid, acrylates, acrylate derivatives or carboxylic anhydrides that bear double bonds, for example maleic anhydride, or at least two of these. Among these, preference is given to polyethylene-maleic anhydride graft polymers (EMAH), ethylene-acrylic acid copolymers (EAA) or ethylene-methacrylic acid copolymers (EMAA), which are sold, for example, under the Bynel® and Nucrel® 0609HSA trade names by DuPont or Escor® 6000ExCo by ExxonMobil Chemicals.

According to the invention, it is preferable that the adhesion between a carrier layer, a polymer layer or a barrier layer and the next layer in each case is at least 0.5 N/15 mm, preferably at least 0.7 N/15 mm and especially preferably at least 0.8 N/15 mm. In one configuration of the invention, it is preferable that the adhesion between a polymer layer and a carrier layer is at least 0.3 N/15 mm, preferably at least 0.5 N/15 mm and especially preferably at least 0.7 N/15 mm. It is further preferable that the adhesion between a barrier layer and a polymer layer is at least 0.8 N/15 mm, preferably at least 1.0 N/15 mm and especially preferably at least 1.4 N/15 mm. If a barrier layer indirectly follows a polymer layer with an adhesion promoter layer in between, it is preferable that the adhesion between the barrier layer and the adhesion promoter layer is at least 1.8 N/15 mm, preferably at least 2.2 N/15 mm and especially preferably at least 2.8 N/15 mm. In a particular configuration, the adhesion between the individual layers is sufficiently strong that a carrier layer is torn apart in an adhesion test, called a cardboard fibre tear in the case of a cardboard as carrier layer.

Polyolefin

A preferred polyolefin is a polyethylene or a polypropylene or both. A preferred polyethylene is one selected from the group consisting of an LDPE, an LLDPE, and an HDPE, or a combination of at least two thereof. A further preferred polyolefin is an mPolyolefin. Suitable polyethylenes have a melt flow rate (MFR) within a range from 1 to 25 g/10 min, preferably within a range from 2 to 20 g/10 min and especially preferably within a range from 2.5 to 15 g/10 min, and a density within a range from 0.910 g/cm$^3$ to 0.935 g/cm$^3$, preferably within a range from 0.912 g/cm$^3$ to 0.932 g/cm$^3$, and further preferably within a range from 0.915 g/cm$^3$ to 0.930 g/cm$^3$.

mPolymer

An mPolymer is a polymer which has been prepared by means of a metallocene catalyst. Metallocene is an organometallic compound in which a central metal atom is arranged between two organic ligands, for example cyclopentadienyl ligands. A preferred mPolymer is an mPolyolefin, preferably an mPolyethylene or an mPolypropylene or both. A preferred mPolyethylene is one selected from the group consisting of an mLDPE, an mLLDPE, and an mHDPE, or a combination of at least two thereof.

Extrusion

In the extrusion, the polymers are typically heated to temperatures of 210 to 330° C., measured at the molten polymer film beneath the exit from the extruder die. The extrusion can be effected by means of extrusion tools which are known to those skilled in the art and are commercially available, for example extruders, extruder screws, feed blocks, etc. At the end of the extruder, there is preferably an orifice through which the polymer melt is pressed. The opening may have any shape that allows extrusion of the polymer melt to the composite precursor. For example, the opening may be angular, oval or round. The opening is preferably in the form of a slot of a funnel. In a preferred configuration of the method, application is effected through a slot. The slot preferably has a length within a range from 0.1 to 100 m, preferably within a range from 0.5 to 50 m, especially preferably within a range from 1 to 10 m. In addition, the slot preferably has a width within a range from 0.1 to 20 mm, preferably within a range from 0.3 to 10 mm, especially preferably within a range from 0.5 to 5 mm. During the application of the polymer melt, it is preferable that the slot and the composite precursor move relative to one another. Preference is given to such a process wherein the composite precursor moves relative to the slot.

In a preferred extrusion coating method, the polymer melt is stretched during the application, this stretching preferably being effected by melt stretching, and most preferably by monoaxial melt stretching. For this purpose, the layer is applied to the composite precursor in the molten state by means of a melt extruder, and the layer applied, which is still in the molten state, is subsequently stretched, preferably in monoaxial direction, in order to achieve orientation of the polymer in this direction. Subsequently, the layer applied is left to cool for the purpose of heat-setting. In this context, it is especially preferable that the stretching is effected by at least the following application steps:

b1. emergence of the polymer melt as a melt film through at least one extruder die slot with an emergence rate $V_{out}$;

b2. application of the melt film to the composite precursor moving relative to the at least one extruder die slot with a movement rate $V_{pre}$;

where $V_{out} < V_{pre}$. It is especially preferable that $V_{pre}$ is greater than $V_{out}$ by a factor in the range from 5 to 200, especially preferably within a range from 7 to 150, further preferably within a range from 10 to 50 and most preferably within a range from 15 to 35. It is preferable here that $V_{pre}$ is at least 100 m/min, especially preferably at least 200 m/min and most preferably at least 350 m/min, but typically not more than 1300 m/min. Once the melt layer has been applied to the composite precursor by means of the above-described stretching process, the melt layer is left to cool down for the purpose of heat-setting, this cooling preferably being effected by quenching via contact with a surface which is kept at a temperature within a range from 5 to 50° C., especially preferably within a range from 10 to 30° C.

In a further preferred configuration, the area which has emerged is cooled down to a temperature below the lowest melting temperature of the polymers provided in this area or its flanks, and then at least the flanks of the area are separated from this area. The cooling can be effected in any manner which is familiar to the person skilled in the art and seems to be suitable. Preference is given here too to the heat-setting which has already been described above. Subsequently, at least the flanks are separated from the area. The separation can be conducted in any manner which is familiar to the person skilled in the art and seems to be suitable. Preferably, the separation is effected by means of a knife, laser beam or waterjet, or a combination of two or more thereof, the use of knives being especially preferable, especially knives for shearing.

Food and Drink Products

The present sheetlike composite and the container precursor are preferably designed for production of a food or drink product container. In addition, the closed container according to the invention is preferably a food or drink product container. Food and drink products include all kinds of food and drink known to those skilled in the art for human consumption and also animal feeds. Preferred food and drink products are liquid above 5° C., for example milk products, soups, sauces, non-carbonated drinks.

Container

The closed container according to the invention may have a multitude of different shapes, but preference is given to an essentially cuboid structure. In addition, the full area of the container may be formed from the sheetlike composite, or it may have a two-part or multipart construction. In the case of a multipart construction, it is conceivable that, as well as the sheetlike composite, other materials are also used, for example plastic, which can be used particularly in the top or base regions of the container. In this context, however, it is preferable that the container is formed from the sheetlike composite to an extent of at least 50%, especially preferably to an extent of at least 70% and further preferably to an extent of at least 90% of the area. In addition, the container may have a device for emptying the contents. This may be formed, for example, from plastic and be mounted on the outside of the container. It is also conceivable that this device has been integrated into the container by direct injection moulding. In a preferred configuration, the container according to the invention has at least one edge, preferably from 4 to 22 or else more edges, especially preferably from 7 to 12 edges. Edges in the context of the present invention are understood to mean regions which arise in the folding of a surface. Illustrative edges include longitudinal contact regions between two wall surfaces of the container in each case, also referred to as longitudinal edges herein. In the container, the container walls are preferably the surfaces of the container framed by the edges. Preferably, the interior of a container according to the invention comprises a food or drink product.

Test Methods

The test methods which follow were utilized in the context of the invention. Unless stated otherwise, the measurements were conducted at an ambient temperature of 23° C., an ambient air pressure of 100 kPa (0.986 atm) and a relative air humidity of 50%.

MFR

MFR is measured in accordance with standard ISO 1133 (unless stated otherwise at 190° C. and 2.16 kg).

Density

Density is measured in accordance with standard ISO 1183-1.

Melting Temperature

Melting temperature is determined using the DSC method ISO 11357-1, -5. The instrument is calibrated according to manufacturer's instructions using the following measurements:

temperature indium—onset temperature,
melting heat indium,
temperature zinc—onset temperature.

Oxygen Permeation Rate

Oxygen permeation rate is determined in accordance with standard ISO 14663-2 Annex C at 20° C. and 65% relative air humidity.

Moisture Content of Cardboard

Moisture content of cardboard is measured in accordance with standard ISO 287:2009.

Adhesion

The adhesion of two adjacent layers is determined by fixing them in a 90° peel test instrument, for example of the firm Instron "German rotating wheel fixture", on a rotatable roller which rotates at 40 mm/min during the measurement. The samples were previously cut into strips of width 15 mm. On one side of the sample, the laminas are detached from one another and the detached end is clamped in a tensile device directed vertically upward. A measuring instrument to determine the tensile force is attached to the tensile device. As the roller rotates, the force needed to separate the laminas from one another is measured. This force corresponds to the adhesion of the layers to one another and is reported in N/15 mm. The separation of the individual layers can be effected mechanically, for example, or by means of a controlled pretreatment, for example by soaking the sample in 30% acetic acid at 60° C. for 3 min.

Detection of Colourants

Detection of organic colourants can be conducted in accordance with the methods described in "Industrial Organic Pigments, Third Edition" (Willy Herbst, Klaus Hunger Copyright © 2004 WILEY-VCH Verlag GmbH & Co. KGaA, Weinheim ISBN: 3-527-30576-9).

Shaping Coefficient

The shaping coefficient is defined as follows:

Shaping coefficient=shaping force/(zero sample force·grammage).

This can be represented as:

$$K = \frac{F_{shaping}}{F_{zero\ sample} \cdot G} = \left[\frac{N}{mN \cdot \frac{g}{m^2}}\right] \triangleq 1000000 \frac{m^2}{kg}$$

where K is the shaping coefficient, $F_{shaping}$ is the shaping force, $F_{zero\ sample}$ is the zero sample force and G is the grammage. Thus, the unit of the shaping coefficient is m²/kg. The individual parameters of the shaping coefficient are determined as specified below.

Zero Sample Force

Figure 8:
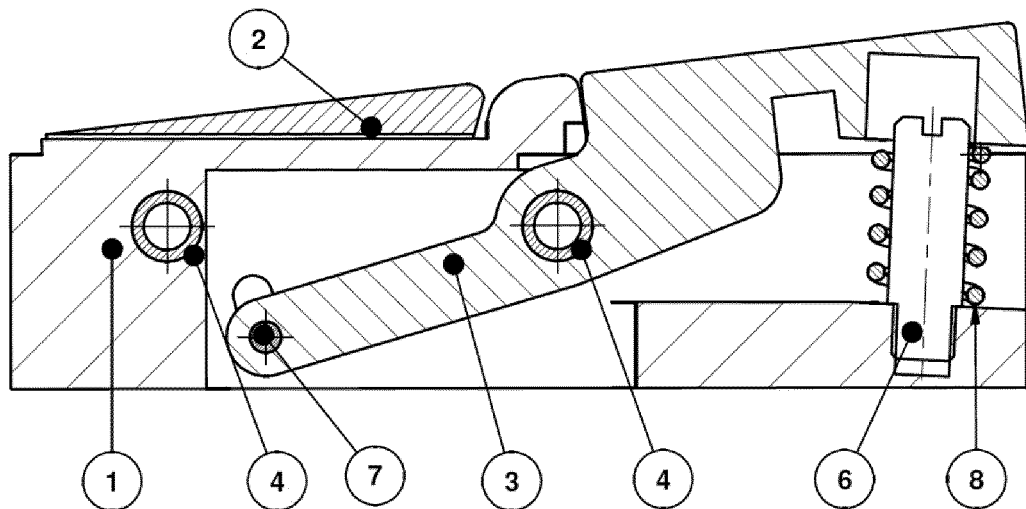
Figure 8:
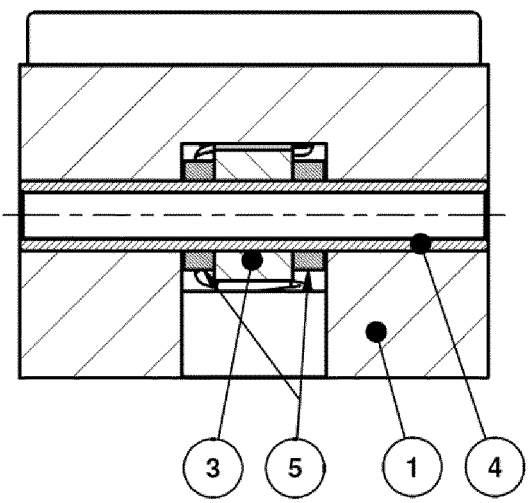

To measure the zero sample force, three specimens are taken from the uncreased container precursor according to German version of DIN EN ISO 186:2002, the sample size being 60 mm×25 mm. These specimens are then analysed by means of an SRT-Win 1.5 die-cut and crease tester from Karl Marbach GmbH & Co. KG, Heilbronn, Germany, according to the operating instructions dated March 2010. This is done by clamping the specimens in a holding clamp developed in-house and placing them onto the turntable. The configuration of the clamp is shown in FIGS. 8 *a*) and *b*), 9 *a*) and *b*) and 10 *a*) and *b*). The evaluation is effected according to DIN 55437-3:2008-05 and DIN 53121:2014-08, the maximum force value over the bending angle range being determined here at bending of up to 150°.

Shaping Force

To measure the shaping force, the container precursor is clamped in unchanged form in the flat-folded state between two compression plates of a strength testing machine (TIRA test 28025 universal strength testing machine) from TIRA GmbH, Schalkau, Germany and, as in the "Compression test" method according to DIN EN ISO 12048:2000, in the case of the compression test, a load is applied until a fixed displacement (to be selected according to the container precursor format, typically 30 mm) has taken place. The curve profile is recorded and evaluated with the TIRA test software.

The universal strength testing machine is a motor-driven compression plate system capable of applying a load which results from uniform movement of one of the plates at a relative speed of 10 mm/min±3 mm/min.

Grammage

The grammage is determined by taking a laminate sample of defined size from the container precursor and weighing the sample.

The invention is described in more detail hereinafter by examples and drawings, although the examples and drawings do not imply any restriction of the invention. Moreover, the drawings, unless stated otherwise, are not to scale.

For the examples (inventive) and comparative examples (noninventive), laminates were produced with the following layer sequence by a layer extrusion method with a standard extrusion coating system.

TABLE 1

Layer structure of the laminates used for the examples and comparative examples

| Layer designation | Material | Grammage [g/m$^2$] |
|---|---|---|
| Decorative layer | MAS ink series, SunChemical, Parssippany, US | / |
| Outer polymer layer | LDPE 23L430 from Ineos GmbH, Cologne | 15 |
| Carrier layer | Cardboard: Stora Enso Natura T Duplex double coated, Scott bond 200 J/m$^2$ | 191 |
| Lamination layer | LDPE 23L430 from Ineos GmbH, Cologne | 20 |
| Barrier layer | Aluminium, EN AW 8079 from Hydro Aluminium Deutschland GmbH | here thickness 6 μm |
| Inner polymer layer | LDPE 19N430 from Ineos GmbH, Cologne | 40 |

The laminate obtained by the layer extrusion process is used to manufacture container precursors in the form of jackets for the examples and comparative examples. In each case, longitudinal grooves 1 to 4 are introduced, as is the corresponding first to fourth longitudinal fold. Moreover, a longitudinal seam is produced by means of heat sealing. The heat sealing is effected by means of an HSG250 heat-sealing unit from Kopp Verpackungstechnik, Esslingen, Germany. The initial pressure is set to 4.5 bar and the sealing temperature to 135° C.

Table 2 reports, for the various methods, the minimum first to fourth internal angles achieved, i.e. how far the first to fourth longitudinal folds were folded. In addition, Table 2 states the maximum of the fourth internal angle. If the internal angle is increased to more than 180° by folding, this is referred to as overstretching. In addition, Table 2 states whether the container precursor is refolded, i.e. whether it is converted from a relatively flat-folded state to another relatively flat-folded state.

TABLE 2

Figures for the folding of the laminates and/or container precursors according to the examples and comparative examples

| | Minima of the internal angles | | | | Maximum of the 4th internal | |
|---|---|---|---|---|---|---|
| Example | 1st | 2nd | 3rd | 4th | angle | Refolding |
| Comparative Example 1 | 0° | 0° | 0° | 0° | 180° | Yes, several times |
| Comparative Example 2 | 30° | 15° | 30° | 15° | 180° | No |
| Example 1 | 5° | 5° | 5° | 5° | 204° | No |
| Example 2 | 5° | 5° | 5° | 5° | 192° | No |
| Example 3 | 5° | 5° | 5° | 5° | 180° | No |
| Example 4 | 10° | 10° | 10° | 10° | 180° | No |

In addition, a multitude of container precursors are introduced into an outer transport package. The outer transport package has the dimensions of: length 600 mm; width 110 mm; height 152 mm.

TABLE 3

Characterization of the container precursors according to the examples and comparative examples

| Example | Shaping coefficient of the container precursor [m$^2$/kg] | Shaping faults in filling machine [per 1000] | Damage to the decorative layer | Number of jackets in an outer package |
|---|---|---|---|---|
| Comparative Example 1 | 5 | 123 | − | 340 |
| Example 1 | 8 | 0 | + | 320 |
| Example 2 | 10 | 0 | + | 303 |
| Example 3 | 11.7 | 0 | + | 293 |
| Example 4 | 15 | 1 | 0 | 278 |
| Comparative Example 2 | 34 | 87 | − | 178 |

The damage to the decorative layer is characterized in Table 3 according to the following scale:
+ no damage to the decorative layer (not apparent either to the naked eye or with a magnifying glass with 6-fold magnification)
0 slight damage to the decorative side (apparent with a magnifying glass with 6-fold magnification)
− damage to the decorative side visible by eye The results in Table 3 have been established using a CFA 712 standard filling machine from SIG Combibloc, Linnich, Germany. For this purpose, 1000 container precursors were processed on the filling machine for each example and comparative example. The shaping coefficient was measured for each example and comparative example prior to the outer packaging of the container precursors by the method described above.

Tables 4 and 5 below show further comparative examples. These have been conducted as the comparative examples above, except for the details provided below.

According to comparative example 3, the laminates have been folded flat once in the production of the longitudinal seam. This results in the minima of the internal angles given in Table 4. Then the shaping coefficient has been measured according the method provided above. Further, the container precursors obtained have been introduced into the outer transport package as explained above without any further folding or refolding. Then, the container precursors have been taken out of the outer transport package and have been introduced into the filling machine described above without any further folding or refolding in between.

According to comparative example 4, the laminates also have been folded flat once in the production of the longitudinal seam. At this stage, the container precursors have the same shaping coefficient as in comparative example 3 (not given in Table 5). Just as in comparative example 3, the container precursors obtained have been introduced into the outer transport package without any further folding or refolding. After the container precursors have been taken out of the outer transport package, they have been brought into a rectangular shape. Hence, the container precursors have been folded once to obtain a rectangular transverse cross section. This way, the minima of the internal angles given in Table 4 have been obtained. Further, the shaping coefficient has been measured. The value measured at this stage is given in Table 5. Next, the container precursors have been introduced into the filling machine without any further folding or refolding.

The results of processing the container precursors of comparative examples 3 and 4 in the filling machine are provided in Table 5 below. Therein, the same scale as in Table 3 applies.

TABLE 4

Figures for the folding of the laminates and/or container precursors according to the further comparative examples

| Example | Minima of the internal angles | | | | Maximum of the 4th internal angle | Refolding |
|---|---|---|---|---|---|---|
| | 1st | 2nd | 3rd | 4th | | |
| Comparative Example 3 | 180° | 0° | 180° | 0° | 180° | No |
| Comparative Example 4 | 90° | 0° | 90° | 0° | 180° | No |

TABLE 5

Characterization of the container precursors according to the further comparative examples

| Example | Shaping coefficient of the container precursor [m²/kg] | Shaping faults in filling machine [per 1000] | Damage to the decorative layer | Number of jackets in an outer package |
|---|---|---|---|---|
| Comparative Example 3 | 33.2 | 65 | – | 190 |
| Comparative Example 4 | 31.3 | 40 | – | 190 |

It is to be understood that in the examples and comparative examples container precursors which have been used to measure the shaping coefficient have not been processed further. Instead, container precursors which have been produced and treated in the same way have been processed further as described above.

The figures respectively show, in schematic form and not to scale unless stated otherwise in the description or the respective figure:

FIG. 1a) a container precursor of the invention in top view (upright), with detail view of a longitudinal groove;

FIG. 1b) a further container precursor of the invention in top view (upright)

Figure 2:
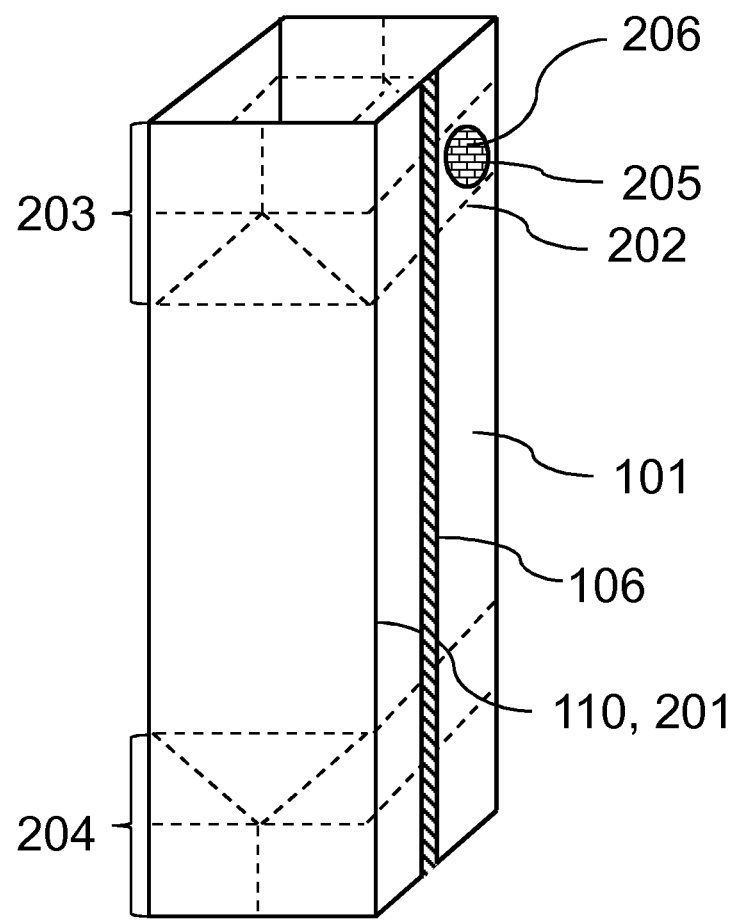
Figure 3:
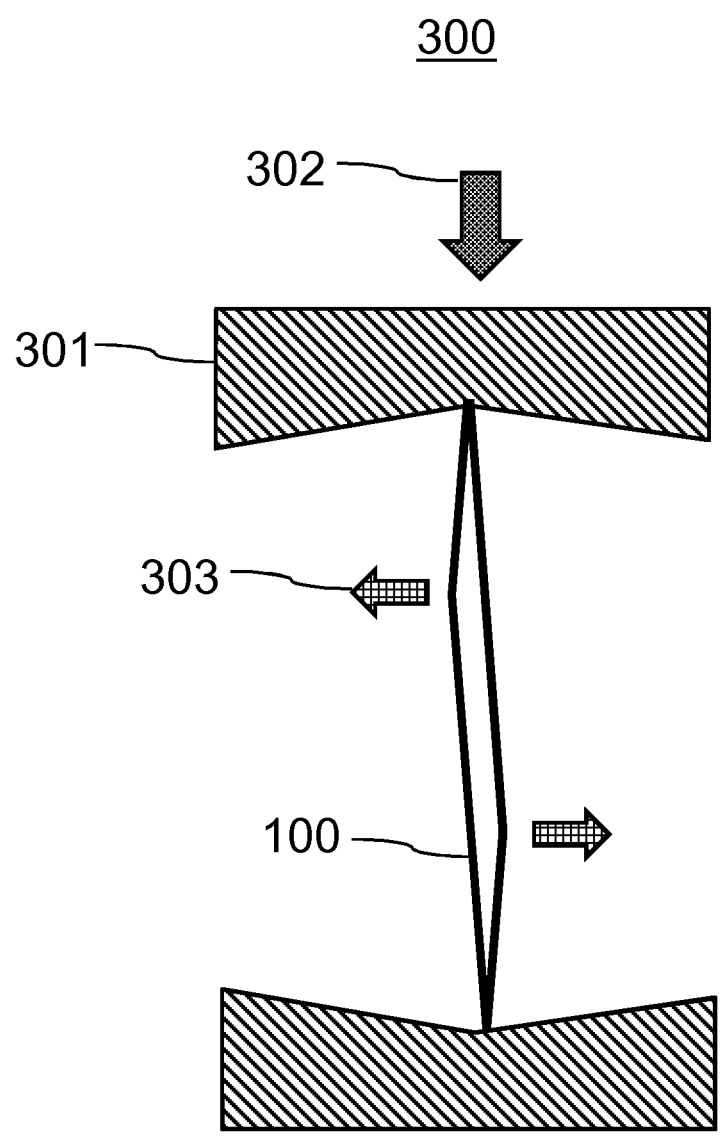
Figure 4:
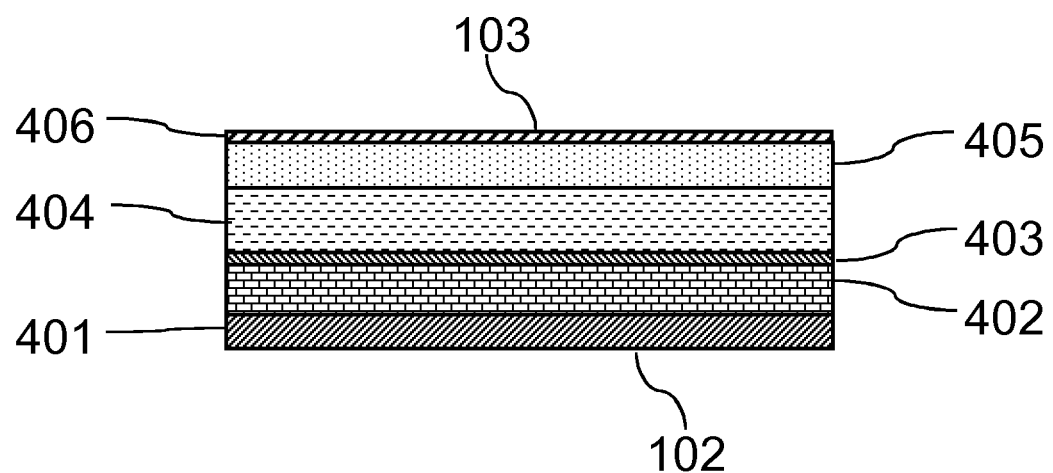
Figure 5:
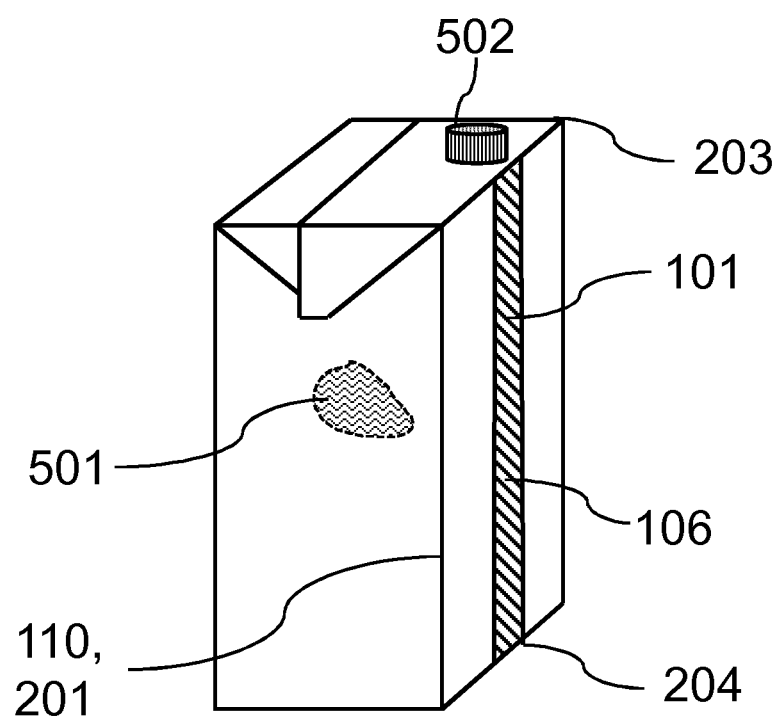
Figure 6:
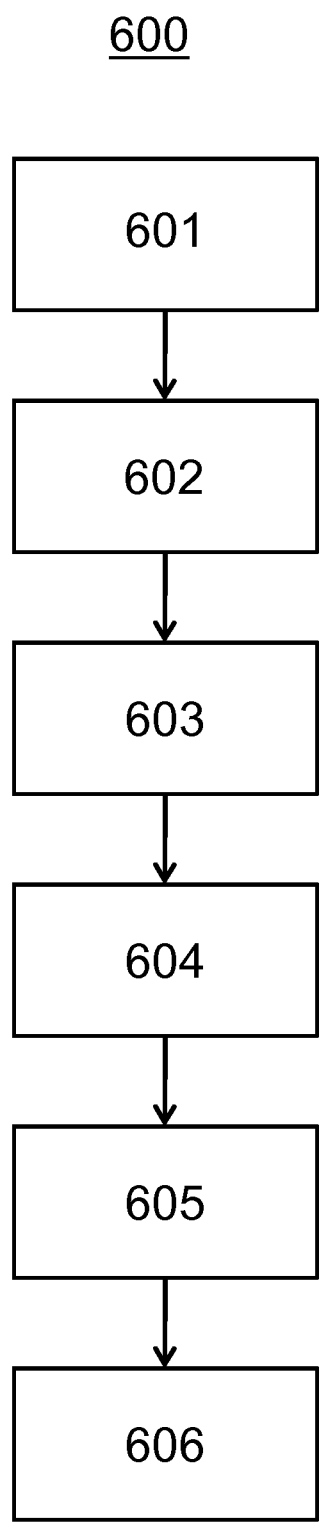
Figure 7:
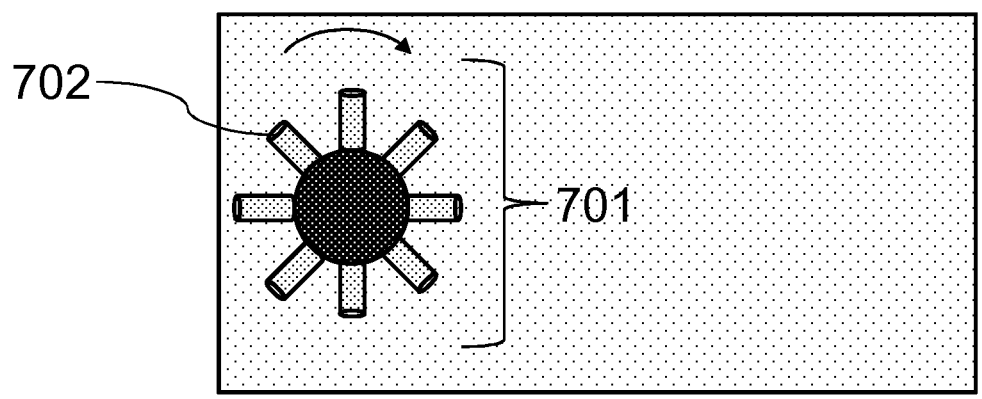
Figure 9:
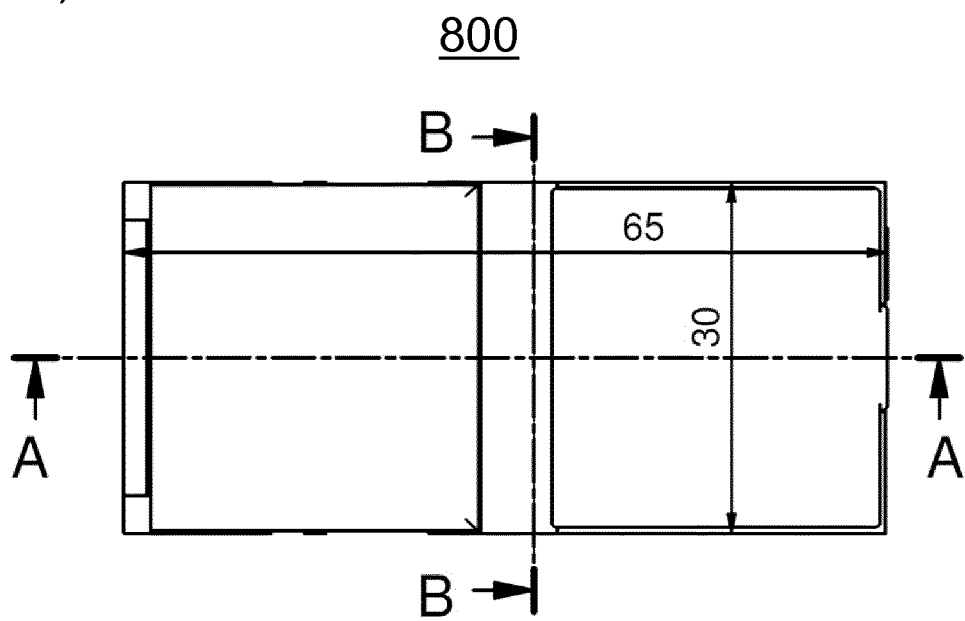
Figure 9:
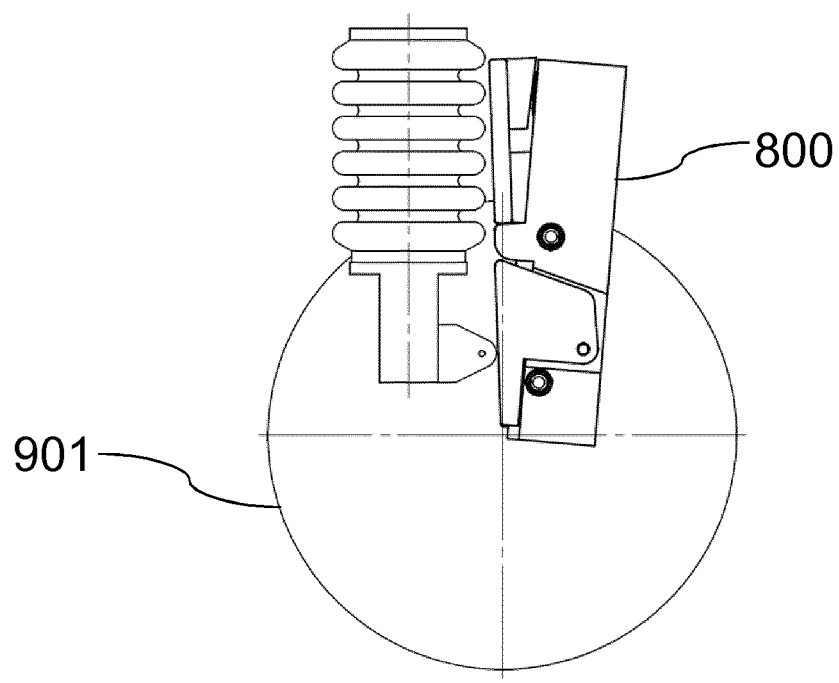
Figure 10:
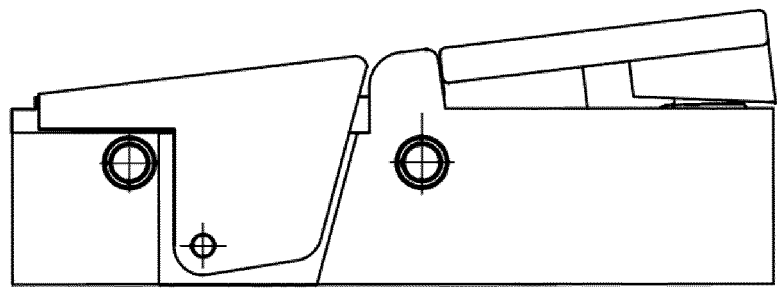
Figure 10:
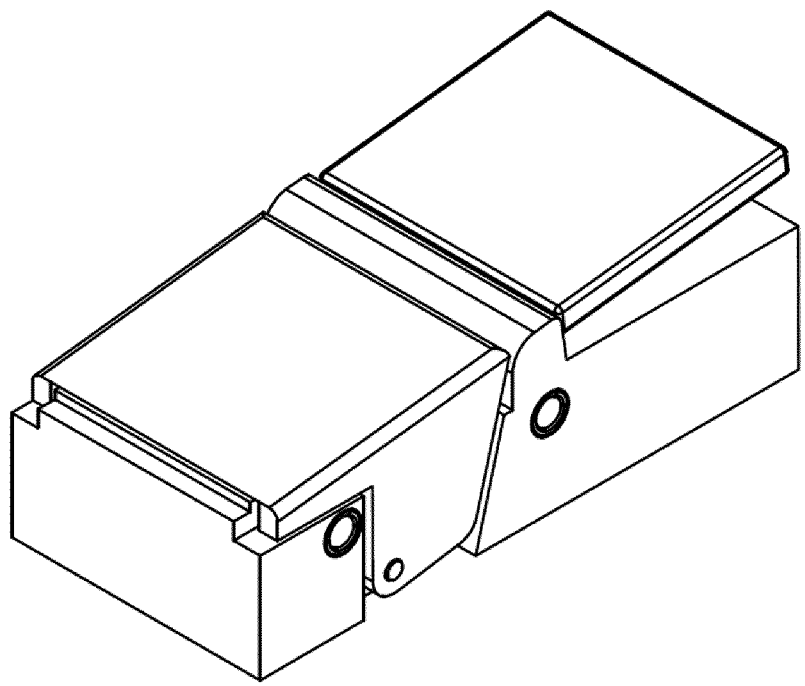

FIG. 2 the container precursor according to FIG. 1a) in side view (upright) after shaping;

FIG. 3 an experimental setup for measuring the shaping force;

FIG. 4 a layer sequence of the sheetlike composite of the container precursor according to FIG. 1a) in cross section;

FIG. 5 a closed container of the invention;

FIG. 6 a flow diagram of a method of the invention;

FIG. 7 an apparatus of the invention;

FIG. 8a) a holding clamp;

FIG. 8b) the holding clamp according to FIG. 8a) in a further view;

FIG. 9a) the holding clamp according to FIG. 8a) in a further view;

FIG. 9b) the holding clamp according to FIG. 8a) with a turntable;

FIG. 10a) the holding clamp according to FIG. 8a) in a further view;

FIG. 10b) the holding clamp according to FIG. 8a) in a further view; and

Figure 11:
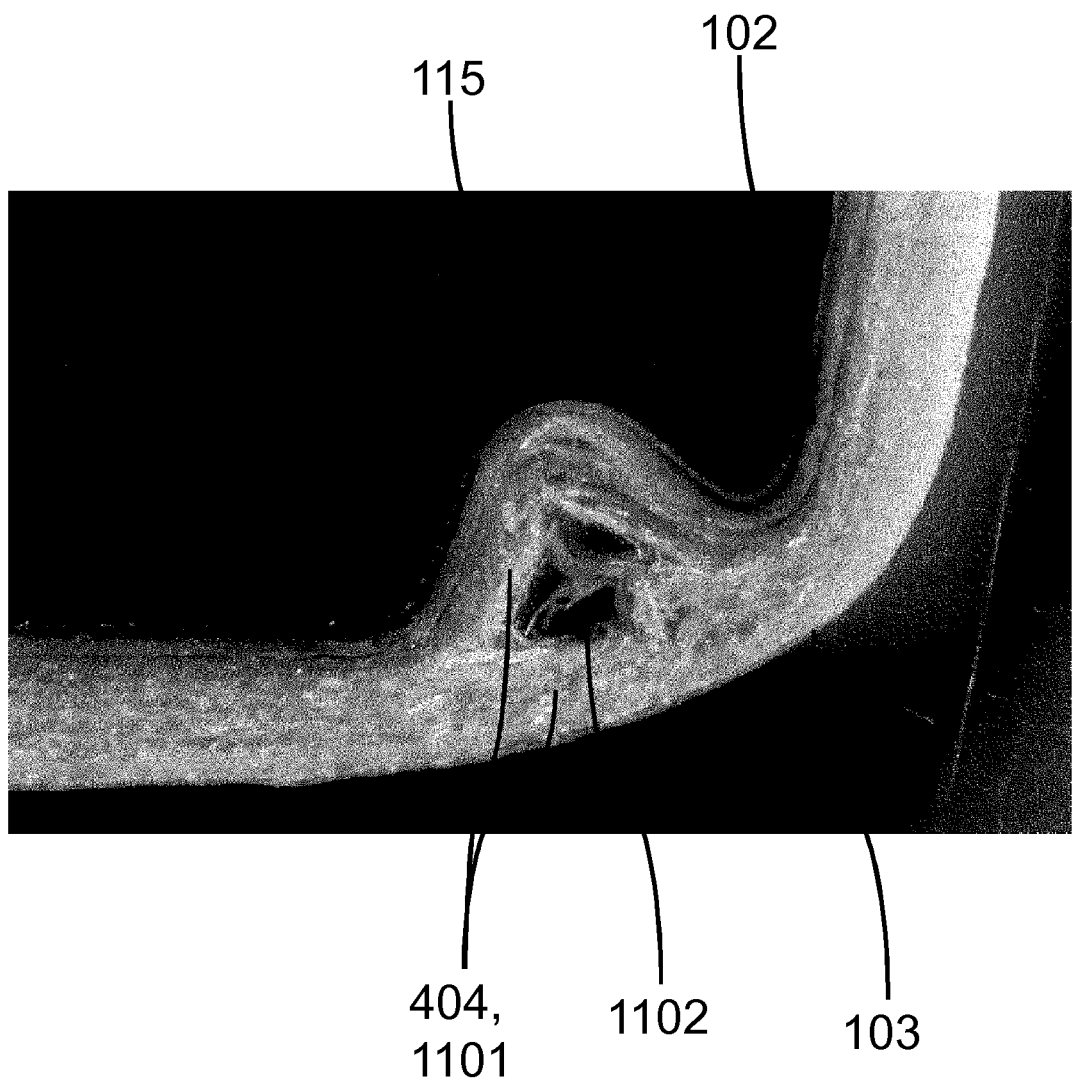

FIG. 11 a microscope image of a longitudinal groove in a sheetlike composite of a container precursor of the invention in cross section.

FIG. 1a) shows a container precursor 100 of the invention in top view (upright), with a detail view of a longitudinal groove 107-110. The container precursor 100 consists of a sheetlike composite 101, the layer structure of which is shown in FIG. 4 in cross section. The sheetlike composite 101 here is a blank for production of a single container 500. The container precursor 100 comprises a first longitudinal edge 104 and, on the opposite side across the sheetlike composite 101, a further longitudinal edge 105. The first longitudinal edge 104 is sealed to the further longitudinal edge 105. In this way, a longitudinal seam 106 of the container precursor 100 is formed. In this container precursor 100, the longitudinal seam 106 runs through about the middle of a wall face of the container precursor 100. Across the sheetlike composite 101, from the first longitudinal edge 104 to the further longitudinal edge 105, the sheetlike composite 101 comprises a first longitudinal groove 107, a second longitudinal groove 108, a third longitudinal groove 109 and a fourth longitudinal groove 110. At the same time, a first longitudinal fold runs along the first longitudinal groove 107, a second longitudinal fold along the second longitudinal groove 108, a third longitudinal fold along the third longitudinal groove 109 and a fourth longitudinal fold along the fourth longitudinal groove 110. The longitudinal folds are each intended to form a longitudinal edge 201 in the closed container 500 to be produced. The first longitudinal fold is characterized by a first internal angle 111, the second longitudinal fold by a second internal angle 112, the third longitudinal fold by a third internal angle 113, and the fourth longitudinal fold by a fourth internal angle 114. The first internal angle 111 and the third internal angle 113 here are each 177°, and the second internal angle 112 and the fourth internal angle 114 are each 3°. Thus, the container precursor 100, in accordance with the invention, is in a flat-folded state. By shaping 303 the flat-folded container precursor 100, it can be shaped to form a jacket structure. The shaping 303 can be effected by simultaneous folding of the first to fourth longitudinal folds as indicated in FIG. 3. FIG. 1a) also shows, in a dotted circle, a detail view of the second longitudinal groove 108. It can be seen here that the longitudinal grooves 107-110 each have a bulge on an inner face 102 of the sheetlike composite 101 and a recess 116 on an outer face 103 of the sheetlike composite 101. Thus, the longitudinal grooves 107-110 have been produced by creasing with a creasing tool from the outer face 103.

FIG. 1b) shows a further container precursor 100 of the invention in top view (upright). The container precursor 100 according to FIG. 1b) is configured in the same way as the container precursor 100 according to FIG. 1a), with the longitudinal seam 106 running next to the first longitudinal fold in FIG. 1b). Moreover, the naming of the first longitudinal edge 104 and of the further longitudinal edge 105 and hence the designation of the first to fourth longitudinal grooves 107-110 is chosen differently here from that in FIG. 1a).

FIG. 2 shows the container precursor 100 according to FIG. 1a) in side view (upright) after shaping 303. Thus, the container precursor 100 in FIG. 2 is no longer in the flat-folded state of the invention. In the side view shown in FIG. 2, compared to FIG. 1a), a hole 205 is also visible in a carrier layer 404 of the sheetlike composite 101. The hole 205 has been covered with an adhesion promoter layer 403, a barrier layer 402 and an inner polymer layer 401 as hole-covering layers 206 on the inner face 102 of the sheetlike composite 101. Also shown are further grooves 202. By folding along the further grooves 202 and bonding appropriate parts of the sheetlike composite 101, it is possible to form a top region 203 and a base region 204 of a closed container 500. Also shown here is a longitudinal edge 201 formed from the fourth longitudinal fold along the fourth longitudinal groove 110.

FIG. 3 shows an experimental setup 300 for measuring the shaping force. The container precursor 100 according to FIG. 1a) is clamped here between two compression plates 301 of a compression plate system of a universal strength testing machine. The compression plate system is motor-driven, such that the upper compression plate 301 can execute a uniform downward movement 302. As a result, shaping 303 of the container precursor from the flat-folded state takes place to give a jacket structure. Further details relating to the measurement are reported under the "Shaping force" test method.

FIG. 4 shows a layer sequence 400 of the sheetlike composite 101 of the container precursor 100 according to FIG. 1a) in cross section. From the inner face 102 of the sheetlike composite 101 to the outer face 103 of the sheetlike composite 101, the layer sequence 400 comprises an inner polymer layer 401, a barrier layer 402, an adhesion promoter layer 403, a carrier layer 404, an outer polymer layer 405 and, printed thereon, a colour layer 406 which comprises a colourant and constitutes a decoration 406.

FIG. 5 shows a closed container 500 of the invention. The closed container 500 was obtained by closing the container precursor 100 according to FIG. 2. The closure was effected here in the form of folding of the sheetlike composite 101 and bonding of regions of the sheetlike composite 101 with forming and closure of the base region 204, filling of the container precursor 100 with a food or drink product 501 and further folding of the sheetlike composite 101 thereby forming the top region 203 and closing the top region 203 by sealing. In addition, the closed container 500 was bonded to an opening aid 502 on the outer face 103. A lid of the opening aid 502 covers the hole 205 here.

FIG. 6 shows a flow diagram of a method 600 of the invention. The method 600 comprises a method step of a) 601 providing the container precursor 100 according to FIG. 1a). Prior to a method step b) 602 and after the method step a) 601, the container precursor 100 is first shaped to form a jacket structure as shown in FIG. 2 and then, in method step b) 602, a base region 204 is formed by folding the sheetlike composite 101. In the folding operation, regions of the sheetlike composite 101 to be folded have a temperature of 24° C. In a method step c) 603, the base region 204 is closed by sealing with hot gas. In a method step d) 604, the container precursor 100 is filled with a food or drink product 501. In a method step e) 605, by folding the container precursor 100, a top region 203 is formed, which is closed by sealing with ultrasound. Thus, a closed container 500 of the invention is obtained. In a further method step f) 606, the closed container 500 is bonded to an opening aid 502. The opening aid 502 may be a cutting ring provided with a lid. The method 600 can be conducted with the apparatus 700 according to FIG. 7, and the closed vessel 500 according to FIG. 5 can be obtained.

FIG. 7 shows an apparatus 700 of the invention. The apparatus 700 is a filling machine comprising a mandrel wheel 701 with several mandrels 702. In a production cycle comprising production of a container 500 from a container precursor 100 and filling of the container 500 with a food or drink product 501 and closing of the container 500, the flat-folded container precursor 100 is shaped and placed onto a mandrel 702 of the mandrel wheel 701.

FIG. 8a) shows a holding clamp 800. The holding clamp 800 is an in-house development which serves for performance of the above-described test method for the zero sample force. FIG. 8a) shows a section A-A through the holding clamp 800. The holding clamp especially includes a holding plate 1, a clamp 2, a lever 3, a barrel 4, a spacer ring 5, a bolt 6, a cylinder pin 7 and a compression spring 8.

FIG. 8b) shows the holding clamp 800 according to FIG. 8a) in a further view. What is shown is a section B-B through the holding clamp 800.

FIG. 9a) shows the holding clamp 800 according to FIG. 8a) in a further view with dimensions in mm.

FIG. 9b) shows the holding clamp 800 according to FIG. 8a) with a turntable 901. The holding clamp 800 and the turntable 901 are used in this arrangement for the zero sample force test method as described above.

FIG. 10a) shows the holding clamp 800 according to FIG. 8a) in a further view.

FIG. 10b) shows the holding clamp 800 according to FIG. 8a) in a perspective view.

FIG. 11 shows a microscope image of a longitudinal groove 107-110 of a sheetlike composite 101 of a container precursor 100 of the invention in cross section. It can be seen clearly that the longitudinal groove 107-110 has a bulge 115 on the inner face 102 of the sheetlike composite 101. The recess 116 on the outer face 103 is not visible here. In addition, the carrier layer 404 is split into 2 separate sublayers 1101 along the longitudinal groove 107-110. Between the two sublayers 1101, the carrier layer 404 forms a cavity 1102.

LIST OF REFERENCE NUMERALS

100 Container precursor of the invention
101 Sheetlike composite

102 Inner face
103 Outer face
104 First longitudinal edge
105 Further longitudinal edge
106 Longitudinal seam
107 First longitudinal groove
108 Second longitudinal groove
109 Third longitudinal groove
110 Fourth longitudinal groove
111 First internal angle
112 Second internal angle
113 Third internal angle
114 Fourth internal angle
115 Bulge
116 Recess
201 Longitudinal edge
202 Groove
203 Top region
204 Base region
205 Hole
206 Hole-covering layers
300 Experimental setup to measure the shaping force
301 Compression plate
302 Uniform compression plate movement
303 Shaping
400 Layer sequence
401 Inner polymer layer
402 Barrier layer
403 Adhesion promoter layer
404 Carrier layer
405 Outer polymer layer
406 Colour layer/decoration
500 Closed container of the invention
501 Food or drink product
502 Opening aid
600 Method of the invention
601 Method step a)
602 Method step b)
603 Method step c)
604 Method step d)
605 Method step e)
606 Method step f)
700 Apparatus of the invention
701 Mandrel wheel
702 Mandrel
800 Holding clamp
1 Holding plate
2 Clamp
3 Lever
4 Barrel
5 Spacer ring
6 Bolt
7 Cylinder pin
8 Compression spring
901 Turntable
1101 Sublayer
1102 Cavity

The invention claimed is:

1. A container precursor comprising a sheet, wherein the sheet
a) comprises a layer sequence comprising, as mutually superposed layers, from an inner face of the sheet to an outer face of the sheet,
  i) an inner polymer layer,
  ii) a barrier layer, and
  iii) a carrier layer;
b) comprises a first longitudinal edge and a further longitudinal edge,
  wherein the first longitudinal edge is bonded to the further longitudinal edge forming a longitudinal seam of the container precursor;
c) comprises, in the following sequence in the direction from the first longitudinal edge to the further longitudinal edge
  i) a first longitudinal groove,
  ii) a second longitudinal groove,
  iii) a third longitudinal groove, and
  iv) a fourth longitudinal groove,
wherein a first longitudinal fold along the first longitudinal groove is characterized by a first internal angle of at least 165°;
wherein a second longitudinal fold along the second longitudinal groove is characterized by a second internal angle of not more than 15°;
wherein a third longitudinal fold along the third longitudinal groove is characterized by a third internal angle of at least 165°;
wherein a fourth longitudinal fold along the fourth longitudinal groove is characterized by a fourth internal angle of not more than 15°;
wherein the container precursor can be shaped to form a jacket structure by folding along the first longitudinal groove, the second longitudinal groove, the third longitudinal groove and the fourth longitudinal groove;
wherein the container precursor is characterized by a shaping coefficient within a range from 8 to 30 m²/kg,
wherein the carrier layer of the sheet comprises an oriented material,
wherein the oriented material is characterized by a direction of orientation,
wherein the direction of orientation forms an angle of orientation with one selected from the group consisting of the first longitudinal groove, the second longitudinal groove, the third longitudinal groove and the fourth longitudinal groove, or with a combination of at least two thereof,
wherein the angle of orientation is within a range from 60 to 120°.

2. The container precursor according to claim 1, wherein the longitudinal grooves each comprise a recess on the outer face of the sheet and a bulge on the inner face of the sheet.

3. The container precursor according to claim 1, wherein the carrier layer is split at least partly into at least 2 separate sublayers along at least 2 selected from the group consisting of the first longitudinal groove, the second longitudinal groove, the third longitudinal groove and the fourth longitudinal groove.

4. A closed container obtainable by closing the container precursor according to claim 1.

5. A use of the container precursor according to claim 1 for production of a closed container filled with a food or drink product.

6. A method comprising, as method steps,
a) providing the container precursor according to claim 1,
b) forming a base region of the container precursor by folding the sheet,
c) closing the base region,
d) filling the container precursor with a food or drink product, and
e) closing the container precursor in a top region, thereby obtaining a closed container.

7. The method according to claim 6, wherein at least a portion of the sheet during the folding in method step b) has a temperature within a range from 10 to 50° C.

8. A closed container obtainable by the method according to claim 6.

9. An apparatus designed for
a) producing a container from the container precursor according to claim 1,
b) filling the container with a food or drink product thereby obtaining a filled container, and
c) closing the filled container thereby obtaining a closed container.

\* \* \* \* \*